(No Model.)
K. BOOTH.
MOLD FOR PRISM LIGHTS.
No. 595,262. Patented Dec. 7, 1897.
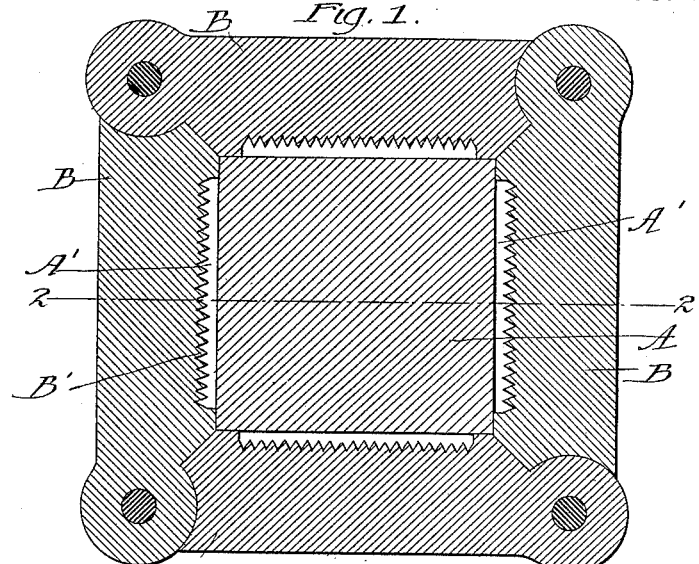
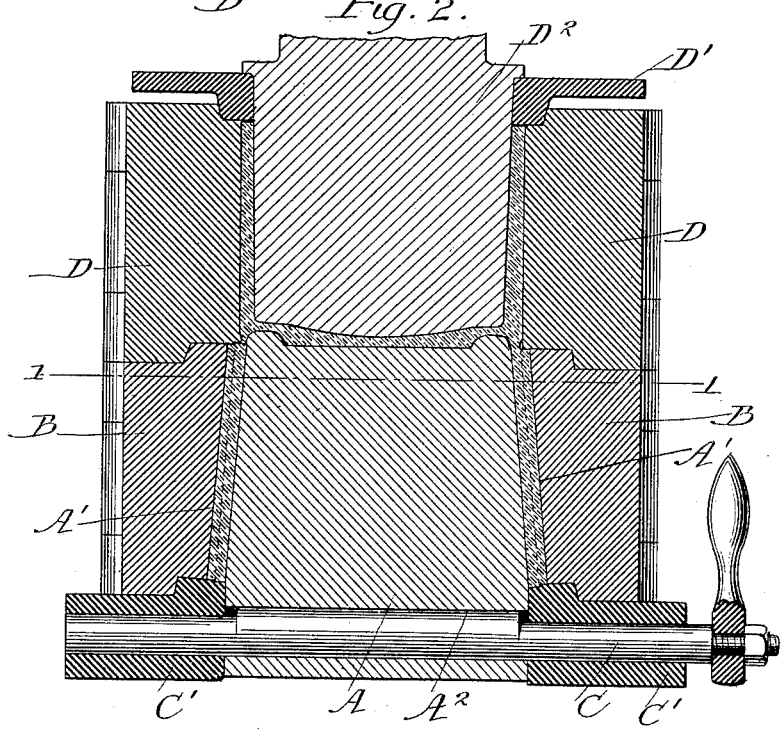
Witnesses:
Frank S. Blanchard
Donald M. Carter
Inventor:
Kraft Booth
By his Attorney
Barnett W. Parker

UNITED STATES PATENT OFFICE.

KRAFT BOOTH, OF CHICAGO, ILLINOIS, ASSIGNOR TO THE LUXFER PRISM PATENTS COMPANY, OF SAME PLACE.

MOLD FOR PRISM-LIGHTS.

SPECIFICATION forming part of Letters Patent No. 595,262, dated December 7, 1897.

Application filed October 4, 1897. Serial No. 653,959. (No model.)

*To all whom it may concern:*

Be it known that I, KRAFT BOOTH, a citizen of the United States, residing at Chicago, in the county of Cook and State of Illinois, have invented certain new and useful Improvements in Molds for Prism-Lights, of which the following is a specification.

My invention relates to molds for prism-lights, and has for its object to provide a new and improved mold of this description.

My invention is illustrated in the accompanying drawings, wherein—

Figure 1 is a transverse section of the mold on line 1 1, Fig. 2. Fig. 2 is a longitudinal section through the mold on line 2 2, Fig. 1.

Like letters refer to like parts throughout both figures.

In molding prism-lights certain conditions are met due to the fact that the prism-light consists of a comparatively thin sheet of glass provided with comparatively thin projecting prisms or parts. These prism-lights have heretofore been molded by means of a mold in which the plunger engages one face of the prism-light. In my present invention I mold a series of prism-lights at one operation by means of what may be called a "fount-mold." This mold may be of various constructions and the several parts may be formed in various ways; but I have selected a particular and simple construction for the purposes of illustration.

As shown in the drawings, the mold is provided with a suitable core A, preferably of metal or some heat-conducting substance. This core may be of any desired shape and is surrounded by an outer part B. The prism-lights are formed between the core and the part B, said prism-lights being formed around said core. The number of prism-lights that can be formed at one time will of course depend upon the number of sides with which the core is provided. In the mold herein illustrated a series of spaces A' are provided between the part B and the core A. The part B is provided with the projecting parts B', which form the prisms on the prism-light. The core A and the part B are preferably connected together, so that they may be moved relatively in order to compensate for the variations in the mold due to the difference in temperature and for any other reason making it desirable to have such a construction. This result may be obtained by any suitable mechanism. As shown in the drawings, a rod or shaft C is mounted in the holding-piece C', which supports the part B. This shaft passes through the core A and is provided with an eccentric part $A^2$, so that when the rod is rotated the core A and the part B may be moved relatively. It is of course evident that the eccentric may be placed in the part C', if desired. Some suitable controlling device is attached to the shaft C, so that its position may be varied. I have illustrated the shaft C as provided with the controlling-handle $C^2$. Located above the core A is a suitable fount or containing part D, in which the material from which the prism-lights are formed is placed. This containing part D is provided with the ring D' and the plunger $D^2$, which works therein. The spaces or recesses A' connect with the opening in the part D, so that when the material is placed therein it will run into said recesses, the recesses being completely filled by the pressure created when the plunger is forced downwardly. The spaces or recesses A' in which the prism-lights are formed are preferably inclined, as illustrated in Fig. 2, so that when the part B is lifted upwardly a short distance it is entirely free from the prism-lights.

In forming prism-lights with the device herein shown the parts are placed together, as illustrated in Fig. 2, and the molten material placed in the opening in the part D. The plunger $D^2$ is then forced downward, so as to force the molten material into the recesses A' and completely fill them. The plunger is then drawn back and the part D removed. The part B is then lifted upwardly, so as to be free from the prism-lights, leaving the prism-lights in position in contact with the core A. It will be seen that by this construction I am enabled to form a series of prism-lights by one operation, the number of lights depending upon the number of sides with which the core A is provided.

When prism-lights are made in the ordinary manner, the plunger comes in contact with the prism-light, and it is exceedingly difficult to make the different prism-lights of uniform thickness. When my mold is used, this difficulty is obviated, for the thickness of the prism-lights depends upon the size of the recesses A', and as these recesses may be made uniform it will be seen that all the prism-lights will be of uniform thickness. The part B is preferably made in sections, as shown in Fig. 1, so that the grooves between the parts A' may be easily milled. These sections are then pinned together at the corners. The part D may also be made in sections similar to the part B; but these sections are pivoted together, so that the mold may be opened. The parts B and D may be connected together, so as to form a single part, if desired. I have shown the core A as solid; but it is of course evident that it may be hollowed out or made of any other desired shape.

It is of course evident that the recesses A' may be formed so as to mold any article desired, and I of course do not limit my invention to the molding of prism-lights.

I claim—

A mold for prism-lights, comprising a core, around which the prism-lights are formed, a surrounding part inclosing said core and movable with relation thereto, a series of recesses between said core and surrounding part, in which the prism-lights are formed, the opposed surfaces of the core and surrounding part inclined so that a relative movement of said core and surrounding part varies the distance between said opposed surfaces, and means for forcing the material from which the prism-lights are formed into said recesses.

KRAFT BOOTH.

Witnesses:
DONALD M. CARTER,
HOMER L. KRAFT.